Patented Mar. 13, 1945

2,371,292

UNITED STATES PATENT OFFICE 2,371,292

FLOTATION REAGENT

Edward H. Hoag, Los Angeles, Calif.

No Drawing. Application January 7, 1944,
Serial No. 517,469

2 Claims. (Cl. 252—61)

Many ores of barite preparatory to beneficiation contain colloids of iron, alumina, and silica all of which by nature adhere tenaciously to the economic mineral barite, preventing efficient separation of said colloidal matter from said mineral barite. Likewise, ores of barite are very often associated with heavy oxides of iron, such as hematite, magnetite, limonite, titanites, also with silica and silicates of alumina. In order to produce a high grade weighting material with high specific gravity for drilling-muds, the barite content should be separated from said colloids and the above minerals.

The reagent consists of a mixture in various proportions of talloel, lauric-acid-ester-diethylene-glycol-ammonium-sulphate, and an alcohol of the general formula $C_nH_{2n+1}OH$ respectively, having low solubility and marked surface tension property chosen from the group consisting of hexanols, heptanols octanols, nonanols, decanols and dodecanols to form an emulsion which is partly soluble or dispersed in water and recognized as an oil-in-water emulsion.

An object of the reagent is to enable it to have good emulsifying and dispersing power, low solubility and marked surface tension property for selective separation of barite from colloidal gangue and from the heavy oxides of iron, alumina and silica.

Another object is to separate a barite concentrate selectively from colloidal iron, alumina and silica at the critical point of separation and activation of said minerals. Another object is to separate barite from colloidal gangue in an acid flotation bath.

Further objects will be disclosed from the description which follows.

Applicant's emulsion consists of various proportions of chemicals as hereinabove stated but preferably for example, talloel (75%), lauric-acid-ester - diethylene - glycol - ammonium - sulphate (20%) and octyl alcohol (5%) chosen as an alcohol and representative of low solubility and marked surface tension property of the general formula $C_nH_{2n+1}OH$ with $n=6$ to 12 inclusive. The emulsion formed by combining these chemicals is of the oil-in-water type. As a flotation reagent it has outstanding qualities as a frother and collector and particularly so for separating barite from colloidal gangue as well as from the heavy oxides of iron such as magnetite and hematite and silica. Several different proportions of the above chemicals in combination give good results, therefore, the reagent mixture should not be confined to the exact percentages as hereinabove stated.

Applicant's emulsion or reagent has stability and selective power. It forms a water sheath and envelopes minerals with a strong hydration factor. It contains free valences due to its polar and insoluble compounds and by its low solubility and high surface tension property of alcohols chosen from the group consisting of the general formula $C_nH_{2n+1}OH$, with $n=6$ to 12 inclusive contributes to increase the number of free valences and power to combine with chemicals or to increase its activity. The emulsoid units contain OH, COOH radicals, therefore, the stability of the emulsion is increased and the hydration factor strengthened for flotation purposes. Conversely, the stability of said emulsoids can be decreased by eliminating electrostatic moments by adding electrolytes which have an equal and opposite electrical charge to that of the emulsoid.

These characteristics as hereinabove stated are utilized for floating or depressing minerals and particularly for separating colloidal gangue from barite at the critical point of separation and activation of said minerals in an acid flotation bath. The acid condition of the bath does not impair the frothing and collecting properties of the emulsion and the separation of minerals as hereinabove stated.

In an alkaline circuit, the reagent depresses heavy oxides of iron such hematite, magnetite and limonite as well as silica. It activates barite thereby causing a separation of these minerals from each other.

In an acid circuit, that is, when the flotation bath has a pH value from 2.0 to 7.0, colloidal iron and alumina are activated and floated and barite is depressed, thereby causing a separation of these minerals from each other. If the flotation bath has a pH value of 7.0 to 7.5, suspensoidal barite is activated and if the bath has a pH value of 8.3 and above coarse barite floats. These differences in pH value of the flotation bath by which said minerals are depressed or activated are the critical points of depression and activation or separation of said minerals from each other. That is, in the above example, colloidal gangue from barite.

This phenomenon suggests that a chemical reaction or metathesis is set up between the anion of the unsaturated fatty acids when combined with lauric-acid-ester-diethylene-glycol-ammonium-sulphate and an alcohol selected with a low solubility and marked surface tension property as described, and a hydrolyzed surface, for example, of an oxide or floc or suspended mineral having a monomolecular film on their surfaces. Also, it suggests that there is a strong surface tension difference set up, whereby, the suspended minerals and flocs are subjects to activation and bubble attachment.

The effectiveness of the reagent on minerals either in an acid or an alkaline circuit is due to its marked surface tension property and low solubility of the alcohols selected as described when mixed with talloel and lauric-acid-esterdiethylene-glycol-ammonium sulphate. Its effectiveness as a frother in either an acid or an alkaline circuit is significant and these characteristics are not similar to other emulsions or reagents.

The reagent has strong dispersive power due to the selected alcohols in combination as hereinabove stated. It separates colloidal gangue from barite in an acid flotation bath. It separates these minerals at their critical point of activation and separation. It produces a barite concentrate free from toxic minerals which would interfere seriously with making a drilling-mud with a "low-water-loss" and "high-mud-yield."

The barite concentrate produced by the flotation reagent gives it superior suspending power and better distribution of particle sizes, indispensable attributes, when mixed for "drilling-muds," and with a very high specific gravity, which is the highest grade barite obtainable by a chemico-physical means.

A comparison of Tables No. 1 and No. 2 indicates the efficiency of the reagent mixture as applicable to barite ores, when associated with colloidal gangue of iron, alumina and silica, suspensoidal materials, heavy oxides of iron such as magnetite and hematite, ores of silicates of alumina.

The tables show the comparative differences in efficiency of the reagent without adding and with adding selected alcohols of low solubility and marked surface tension property as described to talloel and lauric-acid-ester-diethylene-glycol-ammonium sulphate respectively.

TABLE NO. 1

The reagent mixture consisted of talloel (80%) and lauric-acid-ester-diethylene-glycol-ammonium sulphate (20%).

| Product | Weight, per cent | Assay, per cent | | | |
|---|---|---|---|---|---|
| | | BaSO₄ | Fe₂O₃ | SiO₂ | Al₂O₃ |
| Calc. head | 100.00 | 81.34 | 14.26 | 8.17 | 0.55 |
| Conc. and colloids | 73.83 | 94.54 | 7.73 | 4.01 | 0.10 |
| Midds | 10.08 | 73.00 | 12.29 | 10.80 | 1.31 |
| Tails | 16.09 | 26.00 | 45.47 | 25.60 | 2.13 |

| Product | Weight, per cent | Distribution, per cent | | | |
|---|---|---|---|---|---|
| | | BaSO₄ | Fe₂O₃ | SiO₂ | Al₂O₃ |
| Calc. head | | | | | |
| Conc. and colloids | | 85.81 | 40.02 | 36.25 | 13.46 |
| Midds | | 9.04 | 8.69 | 13.33 | 24.06 |
| Tails | | 5.15 | 51.29 | 50.42 | 62.48 | pH value of flotation bath 6.5 to 8.3.

TABLE NO. 1
REAGENTS AND CONDITIONERS USED IN TEST
*Step No. 1 of process*

| Reagents | Pounds per ton of ore | | | | |
|---|---|---|---|---|---|
| | Conditioner | Rougher | Cleaner No. 1 | Cleaner No. 2 | Total |
| Talloel | | | | | |
| Lauric-acid-ester diethylene-glycol ammonium sulphate | | 0.20 | 0.08 | 0.08 | 0.36 |
| Na₂SiO₃ | 0.20 | | 0.20 | 0.10 | 0.50 | pH value of flotation bath 7.0 to 8.3.

*Step No. 2 of Process*

| Reagents | Pounds per ton of ore | | | | |
|---|---|---|---|---|---|
| | Conditioner | Rougher | Cleaner No. 1 | Cleaner No. 2 | Total |
| Sulphuric acid | 0.70 | | | | 0.70 | pH value of flotation bath 4.0 to 7.0.

TABLE NO. 2

The reagent mixture consisted of talloel (75%), lauric - acid - ester - diethylene - glycol - ammonium sulphate (20%) and octyl alcohol (5%) (representative of alcohols of low solubility and marked surface tension property, chosen from the group as described hereinabove).

| Product | Weight, per cent | Assay, per cent | | | |
|---|---|---|---|---|---|
| | | BaSO₄ | Fe₂O₃ | SiO₂ | Al₂O₃ |
| Calc. head | 100.00 | 81.34 | 14.26 | 8.17 | 0.55 |
| Conc. | 74.12 | 97.40 | 0.031 | 0.74 | 0.056 |
| Colloids | 14.11 | 37.50 | 49.72 | 4.36 | 1.27 |
| Midds | 4.51 | 73.04 | 54.23 | 50.81 | 1.73 |
| Tails | 7.26 | 7.73 | 65.77 | 64.91 | 3.45 |

| Product | Weight, per cent | Distribution, per cent | | | |
|---|---|---|---|---|---|
| | | BaSO₄ | Fe₂O₃ | SiO₂ | Al₂O₃ |
| Calc. head | | | | | |
| Conc. | | 88.75 | 0.16 | 6.72 | 7.47 |
| Colloids | | 6.53 | 49.20 | 7.53 | 42.60 |
| Midds | | 4.03 | 17.15 | 28.06 | 14.19 |
| Tails | | 0.69 | 33.49 | 57.69 | 35.74 | pH value of flotation bath 6.5 to 8.3.

TABLE NO. 2
REAGENTS AND CONDITIONERS USED IN TEST
*Step No. 1 of Process*

| Reagents | Pounds per ton of ore | | | | |
|---|---|---|---|---|---|
| | Conditioner | Rougher | Cleaner No. 1 | Cleaner No. 2 | Total |
| Talloel | | | | | |
| Lauric-acid-ester diethylene-glycol ammonium sulphate | | 0.20 | 0.08 | 0.08 | 0.36 |
| Sodium silicate | 0.20 | | 0.10 | 0.10 | 0.50 | pH value of flotation bath 7.0 to 8.3.

*Step No. 2 of Process*

| Reagents | Pounds per ton of ore | | | | |
|---|---|---|---|---|---|
| | Conditioner | Rougher | Cleaner No. 1 | Cleaner No. 2 | Total |
| Sulphuric acid | 0.70 | | | | 0.70 | pH value of flotation bath 4.0 to 7.0.

Comparison of the above tests (No. 1 and No. 2 tables) shows that when octyl alcohol is introduced into the mixture for the flotation reagent and as a representative of alcohols of low solubility and marked surface tension property chosen from the group consisting of alcohols of the general formula $C_nH_{2n+1}OH$, with $n=$to 6 to 12 —inclusive, that it improves the flotation reagent by not only increasing the weight percent of the barite concentrate but improves its grade.

It removed the colloidal gangue. The sulphuric acid added in the second step of the process did not destroy the froth nor its collecting property for the colloidal gangue (Fe, Al, and $SiO_2$). The barite concentrate was depressed by the $H_2SO_4$, making an excellent separation of the barite from the colloidal gangue. Also, these minerals were separated at their critical point of activation and separation. If hexanols, heptanols, nonanols, decanols and dodecanols were added instead of octyl alcohol, similar results would be obtained. The toxic minerals were removed from the weighting material ($BaSO_4$) for "drilling-muds." The particle size distribution of the weighting material ($BaSO_4$) was improved for "drilling-muds."

The coarse iron oxides such as magnetite and hematite were removed as well as the colloidal iron and alumina and silica so the barite concentrate is useful for other commercial purposes besides "weighing material for drilling-muds."

The tables show the pH value of the flotation bath when colloidal gangue separates from barite due to the reagent mixture and conditioners. They show the critical point of separation and activation as described, due to the reagent mixture. They show the advantages of adding alcohols of low solubility and marked surface tension property as described to the reagent combination to produce selective separation of minerals as hereinabove mentioned.

The formula $C_nH_{2n+1}OH$ represents the general formula for alcohols, where the number $n$ signifies from 6 to 12 inclusive; for example (octyl alcohol=$C_8H_{17}OH$), or for hexanols, heptanols, octanols, nonanols, decanols and dodecanols.

The Serial Number 477,838 relates to a froth flotation process for producing high grade barite concentrates, using the flotation reagent described hereinabove.

The Serial Numbers 536,100 and 508,507 respectively relate to improved mud-laden-fluids.

I claim:

1. A flotation reagent for the concentration of barite ores as described, comprising, talloel, lauric-acid- ester-diethylene glycol-ammonium sulphate and an alcohol selected from the group consisting of hexanols, heptanols, octanols, nonanols, decanols and dodecanols.

2. A flotation reagent for the concentration of barite ores as described, comprising a talloel 75%, lauric-acid-ester - diethylene - glycol ammonium sulphate 20% and octyl alcohol 5%.

E. H. HOAG.